Patented Feb. 8, 1949

2,461,139

UNITED STATES PATENT OFFICE 2,461,139

STARCH ESTER DERIVATIVES AND METHOD OF MAKING SAME

Carlyle G. Caldwell, Forest Hills, N. Y., assignor to National Starch Products Inc., New York, N. Y., a corporation of Delaware No Drawing. Application January 8, 1945, Serial No. 571,969

13 Claims. (Cl. 260—234)

This invention relates to the treatment of starch, in the presence of moisture, with organic acid anhydrides and to the novel derivatives of starch thereby produced.

An object of my present invention is the treatment of starches to impart to the same a greatly lessened tendency to gel after cooking with water. Another object is the production of a starch product of substantially increased water absorptive powers, that is, a starch which can be cooked with substantially greater proportions of water than the corresponding untreated starch, to produce a mass of a given viscosity. Another object is the production of a so-called "inhibited" starch, that is, a starch the granules of which exhibit increased resistance to swelling or to breakdown of viscosity upon cooking in water, this being most apparent in root starches and in such a cereal starch as waxy maize wherein the starch is converted from one which gives a relatively cohesive rubbery mass upon cooking to one in which a relatively non-cohesive, salve-like consistency is obtained.

It will be seen from the following description that the particular character of the starch modification obtained depends upon the particular organic acid anhydride (or mixtures or derivatives thereof) employed in the reaction.

To my knowledge, it has heretofore been considered impossible to react starch, in the presence of moisture, with organic acid anhydrides to obtain products of the above-described type. In order to effect such a reaction between the starch and the acid anhydride, an alkaline medium is essential. However, it would heretofore have been considered that if an organic acid anhydride were added to an alkaline aqueous starch suspension, the anhydride would immediately be completely hydrolized, so that the starch would not actually be in contact with the anhydride, but merely its corresponding acid hydrolisate. I have made the surprising and entirely unpredictable discovery that an organic acid anhydride can be added to an alkaline aqueous starch suspension under such conditions that in spite of the simultaneous presence of anhydride and alkali, the anhydride is not entirely hydrolized to its corresponding acid or salt, but that sufficient anhydride reacts with the starch to produce the unusual products herein described.

I have found that by maintaining the pH within a carefully controlled range during the reaction, the modification of the starch is successfully achieved. I have found that the pH during the reaction should be maintained on the alkaline side. As will be seen from the specific examples of the practice of the invention, listed later in this specification, a pH within a range of not substantially below 7 nor substantially above 11 is preferred, since the efficiency of the reaction appears to diminish rapidly beyond the limits of this range.

Non-gelling starch

I have found that the use of certain anhydrides such as acetic anhydride, propionic anhydride, phthalic anhydride and butyric anhydride in the process produces a starch product with non-gelling characteristics.

It is well known that ordinary corn starch, after cooking with water, sets up or gels to an opaque mass upon cooling. Because of this, ordinary corn starch could heretofore be used for various industrial purposes only with difficulty and under exacting control. For example, in the textile industry, where cooked starch (in water) is used for sizing, the difficulty arises as the temperature of the fluid cooked starch drops. The starch then loses its flow and gels, with the result that it is no longer capable of functioning in the sizing process. This difficulty is further encountered in the textile industry in the finishing and printing operations. The same difficulty arises in the tub sizing of paper; gelling of the starch during this operation cannot be tolerated. For such uses, the starch must possess comparative freedom from gelling. For these reasons, ordinary corn starch could heretofore be used in these industrial processes only with difficulty and under exacting control, the alternative being the use of imported tuber starches and gums or relatively scarce and expensive domestic starches, generally of tuber origin.

Again, in the food industry, starch plays an important part in pie fillings, puddings, and the like, where it is desirable that the starch, after cooking and cooling, shall form a soft-textured gel. It is also desirable that the starch gel be free of syneresis; that is, the phenomenon whereby a starch gel shrinks with the separation of water from the gel.

I have found that ordinary corn starch, when treated with certain anhydrides such as acetic, butyric, propionic or phthalic anhydrides, according to the process of this invention, results in a starch product which is substantially non-gelling. That is, the thus treated corn starch, when cooked with water and cooled, exhibits a markedly reduced tendency to gel to an opaque mass, and retains a comparative clarity and soft or fluid consistency. Cooked suspensions of starches treated in this manner possess comparative clarity, freedom from gelling, freedom from syneresis, with an increase in cohesiveness (as compared to the untreated starch), thus filling a very real industrial need. Another characteristic of the starch product of my invention is a lowered gelatinization temperature as compared to the untreated starch. This again is of real importance in many industrial processes (particularly in food manufacture), since it permits operation at lower temperatures.

Essentially, this phase of the invention, as applied to corn starch, creates a starch product having the characteristics of tuber starch, since non-gelling and cohesiveness are standard characteristics of tuber starches, whereas the property of gelling to a non-cohesive, relatively rigid, opaque mass is characteristic of corn starch.

In the food industry, the relatively non-gelling starch of my present invention permits the preparation of pie fillings, puddings, and the like, which possess the desired soft texture, as well as freedom from syneresis. For textiles, the non-gelling quality of my starch product facilitates the continuous operation of the warp sizing, finishing and printing processes, regardless of temperature differences, and results in a size, finish or print which is smoother and more uniform than that heretofore obtainable. In paper making, non-gelling, and particularly the additional cohesiveness of the cooked starch, is of great value. Tuber starches have been almost universally preferred by the paper industry and, as explained above, the product of my invention transforms ordinary corn starch into a tuberlike type starch. For adhesive manufacture, particularly in the preparation of adhesives for such operations as combining, bag bottom making, and the like, this new starch produces an adhesive having greater cohesiveness, with lessened tendency to become crummy with age. The non-gelling characteristics of the starch product, together with the other beneficial properties herein described, have given it obvious value in other operations where these properties are required.

While the starch treatment of the present invention has particular applicability to grain starches such as corn starch and modified corn starch, it is also applicable, although to a lesser degree, to tuber starches. Tuber starches, such as tapioca, when cooked with water, will not gel to the same degree that corn starch does. Furthermore, tuber starch, when cooked with water, maintains a far greater degree of clarity than the cooked corn starch; whereas the cooked suspension of corn starch quickly becomes a white opaque mass, the tuber starch, after cooking in water, maintains a watery translucence (at room temperature). As applied to corn starch, the treatment of the present invention imparts a non-gelling characteristic comparable to that found in tapioca starch in a corresponding state, when at room temperatures. As applied to tapioca starch, the same treatment imparts a greater clarity than is possible to be obtained in the untreated tapioca starch, at room temperatures, and imparts a minimizing of a gelling characteristic at lower than room temperatures. As will be seen from the examples, low grade tapioca may be treated according to the invention to obtain a degree of clarity and stability heretofore associated only with high grade tapioca.

*Increased water absorption*

When certain anhydrides such as succinic anhydride, maleic anhydride, glutaric anhydride or citraconic anhydride are employed in the process of the present invention they produce starch modifications which, besides possessing the properties of comparative non-gelling and improved clarity described above, also show an amazing increase in water absorptive powers. For example, a starch product can be formed by treatment with succinic anhydride which, after cooking with 50 times its own weight of water, will nevertheless have a definite "body" or thickness far above the watery consistency of the corresponding untreated starches cooked with the same quantity of water. This product exhibits many of the properties of natural gums such as tragacanth, alginates, etc., and its commercial value is obvious.

*Inhibited Starch*

It is known that tuber starches such as tapioca, when cooked with water, give a rubbery cohesive mass. The starch from waxy maize (the genetic name for a variety of corn), while coming within the category of grain starches, nevertheless also possesses this characteristic of rubbery cohesiveness. Just as the tendency of ordinary corn starch to set to a rigid gel is undesirable for many industrial operations, so is this property of rubbery cohesiveness sometimes objectionable. By "inhibition" I refer to the treatment of starch so that when cooked with water the swelling of the granules is retarded or inhibited, this property being most apparent in root starches and in waxy maize, wherein the treated starch when cooled neither sets to a rigid gel nor becomes a rubbery mass but instead maintains a smooth salve-like, non-cohesive consistency. The degree of inhibition may be controlled, by regulating the amount of anhydride added, to a point where although no decrease in swelling is apparent, there nevertheless is a decrease in the tendency to breakdown of viscosity upon prolonged cooking.

By using certain anhydrides such as adipic anhydride or azelaic anhydride in the present process, there is obtained this remarkable property of inhibition.

Thus, for example, waxy maize is not satisfactory for puddings and pie fillings because of its rubbery characteristics; however, when the waxy maize is treated with adipic anhydride, it loses its rubbery character and when cooked gives a smooth salve-like material ideally suited for puddings, pie fillings and the like.

*Method*

The preferred method of the invention is to treat the ungelatinized starch in the form of an aqueous suspension with the organic acid anhydride. This reaction is best carried out at room temperature or lower. It has been found that the pH during the treatment should be maintained on the alkaline side. The pH should preferably not be higher than about 11 nor lower than about 7. This can be accomplished by adding enough of an alkaline medium, such as dilute sodium hydroxide solution to the starch milk to raise the pH as, for example, to 11, then to add the acid anhydride until the pH is lowered to about 7. Alternate addition of alkali and anhydride is continued until the desired percentage of acid anhydride has been added. Another method is to run the alkali and anhydride into the starch milk concurrently, regulating the rate of flow of each of these added materials so that the pH of the starch suspension remains preferably between 9 and 11. Still another method is to add concurrently the starch milk, the alkali and the anhydride into a central vessel, with vigorous agitation.

The percentage of organic acid anhydride to be added depends upon the specific properties desired in the final product; that is, degree of clarity, stability (i. e. the non gelling property), increased water absorption or inhibition desired—but I have found that quantities higher than about 10%, based on the dry starch content, are usually less desirable and the preferred quantities range from about 0.1% to about 5% of organic acid anhydride based upon the dry starch content.

I have also found that the organic acid anhydride treatment of the starch may be carried out in the commercially dry form. By "commerically dry" I mean a dry starch having a moisture content of approximately 5% to 20%. One method of doing this is to blend the starch with trisodium phosphate and the organic acid anhydride and to heat the mixture. Specific examples of this process will be found among the other examples given herein.

Examples of the organic acid anhydride treatment of starch of the present invention follow:

Example 1.—The following example illustrates the organic acid anhydride treatment of corn starch in a water suspension. To 100 parts of corn starch suspended in 125 parts of water at 25°–30° C. is added, with stirring, enough 3% sodium hydroxide solution to raise the pH to 10. Then enough acetic anhydride is added to the suspension to lower the pH to 7. Alternate addition of 3% sodium hydroxide and acetic anhydride is continued until altogether 3% of acetic anhydride on the dry weight of the starch has been added. When all of the acetic anhydride has been added, the starch may be filtered and washed in the usual manner. Cornstarch treated in this way has a very markedly reduced tendency to set to a gel and possesses improved clarity after a suspension of it is cooked and allowed to cool.

Although I prefer sodium hydroxide as the alkaline medium, it is possible to use other alkalis such as ammonium hydroxide, sodium carbonate or calcium hydroxide.

Instead of carrying out the reaction of the anhydride with the starch at temperatures of 25°–30° C., either lower or higher temperatures may be used. For example, if the above process be carried out at 10° C. no easily noticeable difference in the properties of the starch from the properties of that treated at 25°–30° C. can be observed. If the reaction is carried out at 40° C., the tendency of the starch to gel is much less than untreated starch, but the improvement is not as marked as in the product obtained at reaction temperatures of 25°–30° C. It is believed that as the temperature at which the process is carried out is raised, the hydrolysis of the anhydride is speeded up so that there is less time for it to come in contact with and react with the starch. The net result is that at higher temperatures less of the anhydride reacts with the starch.

Example 2.—Another example of the treatment of corn starch in a water suspension illustrating the effect of increased amounts of anhydride is as follows. The steps outlined in Example 1 are followed except that the alternate addition of 3% alkali and acetic anhydride is continued until altogether 10% of acetic anhydride on the dry weight of the starch has been added. The clarity and non-gelling character of this product is only moderately improved over that of the product in Example 1.

Example 3.—The following example illustrates a variation in the treatment of corn starch in a water suspension. Concurrent addition of a 3% sodium hydroxide solution and propionic anhydride is made, with stirring, into a suspension of 100 parts of corn starch in 125 parts of water. The rates of flow of the 3% sodium hydroxide solution and the propionic anhydride are so proportioned that the pH of the starch suspension is maintained in the range of 9 to 10. After 5% of propionic anhydride on the dry weight of the starch taken has been added, the pH of the suspension may conveniently be adjusted to pH 6.5–7 with dilute hydrochloric acid, after which the starch may be filtered and washed in the usual manner. The starch so treated has a marked increase in stability over the corresponding untreated starch—that is, its tendency to gel after cooking with water is considerably lessened.

Example 4.—The following example illustrates the organic acid anhydride treatment of a modified starch such as a so-called "thin-boiling" starch, and using a combination of two organic acid anhydrides. Thin-boiling starches are commonly prepared in the industry by wet acid hydrolysis of starch. The temperature of the reaction is maintained below the peptization point of the starch so that the final product may be easily filtered and washed. The extent of hydrolysis of the starch, as indicated by the body obtained when cooked in a given amount of water, will have a specified value known as the fluidity value. In this example, a 20 fluidity thin-boiling corn starch is treated with maleic and acetic anhydrides. To 100 parts of the thin-boiling corn starch suspended in 125 parts of water is added enough 3% sodium hydroxide solution to raise the pH of the suspension to 10. Then is added .3 part of maleic anhydride. The pH of the suspension is again raised to 10 with 3% sodium hydroxide solution and then is added acetic anhydride in sufficient quantity to lower the pH to 7. Alternate addition of 3% sodium hydroxide solution and acetic anhydride is continued in the above manner until altogether 2% of acetic anhydride on the weight of the thin-boiling starch taken has been added. When the treatment has been completed, the starch may be filtered and washed in the usual manner. Thin-boiling corn starch treated in this way has a very markedly reduced tendency to set to a gel when suspensions of it are cooked in water and allowed to cool.

Example 5.—The following example illustrates a variation in the treatment of a thin-boiling corn starch with two organic acid anhydrides. The procedure is the same as in Example 4, except that the maleic anhydride is dissolved in the acetic anhydride and then this solution of the two anhydrides is added alternately with the 3% sodium hydroxide solution to the starch suspension. A product of considerably increased stability is obtained.

Example 6.—The following example illustrates how the treatment of corn starch with organic acid anhydride may serve to give superior products when the treated starch is subsequently modified as by treatment in suspension with sodium hypochlorite. The procedure of treating starch in suspension with sodium hypochlorite is well known in the industry. The amount of hypochlorite used is varied to obtain products showing certain specified viscosities when they are cooked with a given amount of water. To 100 parts of corn starch suspended in 125 parts of water is added, with stirring, enough 3% sodium hydroxide solution to raise the pH of the suspension to 10. Then, enough maleic anhydride is added to lower the pH to 7. This alternate addition of 3% sodium hydroxide solution and maleic anhydride is continued until altogether 2.5% of maleic anhydride on the weight of dry starch has been added. After treatment of the starch with maleic anhydride is completed, into the same suspension is introduced a solution of sodium hypochlorite containing approximately 5% of available chlorine and a concentration of alkali equal to 36% of the weight of the chlorine present. Enough of the sodium hypochlorite solution is added to the suspension so that the percent of available chlorine on the weight of dry starch is 2%. After a period of about 12 hours, the free chlorine in the starch suspension is removed by treatment with sodium bisulfite, the pH of the suspension is adjusted to 7 with dilute hydrochloric acid and the starch is filtered and washed in the usual way. Thin-boiling corn starch prepared in the above-described manner has the qualities of clarity and non-gelling when cooked with water which heretofore have been possible only with chlorinated tuber starches such as tapioca.

*Example 7.*—The following example illustrates the treatment of corn starch with phthalic anhydride. To 100 parts of corn starch suspended in 125 parts of water is added, with stirring, enough 3% sodium hydroxide solution to raise the pH of the solution to 11. Then is added enough phthalic anhydride to lower the pH to 7. Alternate addition of 3% sodium hydroxide solution and phthalic anhydride is continued until 5 parts of phthalic anhydride altogether have been added. The pH is adjusted to neutral; the starch is then filtered and washed in the usual manner. Corn starch treated in this way has a lessened tendency to gel, after cooking and cooling; is more rubbery and cohesive after cooking; and the product also exhibits a higher water absorption than the corresponding untreated corn starch.

*Example 8.*—The following example illustrates the treatment of corn starch with succinic anhydride. To 100 parts of corn starch suspended in 125 parts of water is added, with stirring, enough 3% sodium hydroxide solution to raise the pH of the suspension to 10. Then is added enough succinic anhydride to lower the pH to 7. Alternate addition of 3% sodium hydroxide solution and succinic anhydride is continued until 2.5 parts of succinic anhydride altogether have been added. The starch is then filtered and resuspended in 125 parts of water, and alternate addition of 3% sodium hydroxide solution and succinic anhydride is continued until a total of 5 parts of succinic anhydride has been added. The starch may now be filtered and washed in the ordinary way. The reason for filtering the starch at the half-way point of the reaction is to remove the excess of sodium succinate formed in the solution and which, because of its buffering action, interferes with the reaction of additional succinic anhydride on the starch unless it is removed. Corn starch treated in the above manner has remarkable properties of clarity and non-gelling when cooked in water. In addition, it may be cooked in as much as 50 parts of water and still show substantial viscosity while ordinary corn starch in the same amount of water has a watery consistency.

Another characteristic shown by this treated starch is a considerably lowered gelatinization temperature.

*Example 9.*—This example of the treatment of corn starch in water suspension with succinic anhydride illustrates the use of a larger amount of the anhydride. The steps followed are the same as given in Example 8 except that a total of 7.5% of succinic anhydride is added, based on the weight of the starch. Filtration of this treated corn starch proves rather difficult as it now has such a high affinity for water that it tends to swell in cold water. It is best recovered and washed in a centrifuge of the perforate basket type. This product has the qualities of clarity, non-gelling and high viscosity to a considerably greater degree than the product described in Example 8.

*Example 10.*—The following example illustrates the organic acid anhydride treatment of a tuber starch and the use of an organic acid anhydride derivative. To 100 parts of low grade tapioca starch suspended in 125 parts of water is added, with stirring, enough 3% sodium hydroxide solution to raise the pH to 10. Enough chloro-maleic anhydride is added to lower the pH of the suspension to 7. This alternate addition of 3% sodium hydroxide solution and chloro-maleic anhydride is continued until altogether 3 parts of chloro-maleic anhydride have been added. When the treatment is completed, the starch may be filtered and washed in the usual manner. Tapioca starch treated in the way described has the quality of giving cooked solutions of greater clarity than is possible with the untreated tapioca starch, and also having higher water absorptive characteristics. While tapioca is not ordinarily considered a gelling starch, untreated tapioca starch in cooked suspension can be caused to retrograde when cooled sufficiently; but when treated as here described the tendency to gel is greatly lessened.

*Example 11.*—The following example illustrates the treatment of waxy maize starch with adipic anhydride. To 100 parts of waxy maize starch suspended in 125 parts of water is added, with stirring, enough 3% sodium hydroxide solution to raise the pH of the suspension to 10. Then is added enough adipic anhydride to lower the pH to 7. Alternate addition of 3% sodium hydroxide solution and adipic anhydride is continued until one part of adipic anhydride has been added. The pH of the suspension is then adjusted to neutral and the starch is filtered and washed in the usual manner. The product obtained by treating waxy maize in this manner is "inhibited," that is, the starch granules show a lessened tendency to swell on cooking in water and the cooked paste has lost the rubbery cohesive character of the corresponding untreated waxy maize. The elimination of the gummy, rubbery characteristic of waxy maize through this treatment increases its value in puddings and pie fillings, among other uses.

*Example 12.*—The following example illustrates another method of conferring on waxy maize starch the inhibited properties described under Example 11. The procedure for treating the starch is the same as in Example 11 except that instead of using adipic anhydride one uses a 17% solution of succinic anhydride dissolved in acetic anhydride and enough of this solution is added to the starch suspension so that 0.5% of succinic anhydride and 2.4% of acetic anhydride on the starch is used.

*Example 13.*—This example illustrates another method for conferring on starch the "inhibited" properties described in Example 11, but in this case, a high grade tapioca starch is used, and the acid anhydride instead of being added as such may be formed in situ. The procedure for treating the starch is the same as in Example 11 except that instead of using adipic anhydride one uses a 20% solution of adipic acid dissolved in acetic anhydride and enough of this solution is added so that 0.5% of adipic acid and 2% of acetic anhydride on the starch is used. It is understood that in dissolving adipic acid in acetic anhydride at least some of the adipic acid is converted to adipic anhydride through reaction with the acetic anhydride. Citric acid may be substituted for the adipic acid in this example, with similar results; and when citric acid is used 0.1% of the citric acid may be used in the example given. This further illustrates the method of forming the anhydride in situ by treating an acid with a suitable dehydrating chemical.

*Example 14.*—The following example illustrates the organic acid anhydride treatment of a relatively dry starch. Corn starch containing 20% moisture is blended with 4% of acetic anhydride and 4% of trisodium phosphate (both based on the weight of the starch). Although the presence of water is essential to the reaction of the invention process, relatively dry powdered starch may be used, a water content from 5% to 20% being sufficient to meet the reaction requirements. The resulting blend of starch, trisodium phosphate and acetic anhydride is then heated in a closed vessel for 2 hours at a temperature of 160° F. After this treatment, the starch may, if desired, be suspended in water and filtered and washed in the usual manner. Besides its lessened tendency to gel, this starch reaction product has the characteristic of increased water absorption. In variations of this method, it has been found that the percentage of each of the added chemicals may comprise up to about 10%, based on the dry weight of the starch. Likewise, other alkaline agents may be used such as, for example, as ammonium hydroxide. Another variation is to dissolve the trisodium phosphate in water and spray the resulting solution into starch containing 10% moisture, to give a starch blend containing 4% trisodium phosphate and about 20% moisture. This blend is then treated as described above.

*Example 15.*—The following is another example illustrating the treatment of a relatively dry corn starch to give it enhanced clarity, non-gelling quality, and increased visocity. The procedure is the same as that in Example 14 except that succinic anhydride is used in place of acetic anhydride. Furthermore, in order to obtain intimate admixture of the succinic anhydride with the starch, it is desirable to dissolve the anhydride in a solvent, such, for example, as acetone, and spray the solution into the starch with thorough blending. The solvent is allowed to evaporate from the starch before the trisodium phosphate and the additional moisture are added.

*Example 16.*—The following example illustrates a method of conferring on waxy maize starch the "inhibited" property described in Example 11, by treating the relatively dry starch with adipic anhydride. The steps of the procedure are the same as those outlined in Examples 14 and 15, except that the anhydride used is that of the adipic acid.

As illustrated among the examples given above, starch which has been subjected to the organic acid anhydride treatment may be further treated and modified or converted according to the various processes already known for converting starches. Also that starch which has already been modified or converted by standard means, such as by acid hydrolysis, to the form of a so-called "fluidity starch," may then be treated with organic acid anhydride in the manner here described. The examples further show that the invention relates not only to the treatment of grain starches but also to tuber starches.

It is also shown that besides the organic acid anhydrides themselves, there may be employed in my process anhydride derivatives such as chloro-maleic anhydride and similar derivatives, or mixtures of anhydrides or derivatives of anhydrides. Acids (for example, citric acid) may be used in admixture with dehydrating chemicals, such as acetic anhydride, acetyl chloride, thionyl chloride or other chemicals having a similar dehydrating effect; the organic acid anhydride being thereby formed in situ.

While I am not certain of the reasons for the effects herein described, I submit by way of explanation, but not by way of any limitation, the following theory. It is suggested that the gelling and loss of clarity of cooked aqueous starch suspensions is due to the nature of the starch molecules. It is believed the starches contain two types of molecules, one having a straight chain formation and the other being characterized by its branched structure. In the recent literature, the straight chain molecules have been generally referred to as amylose and the branched chain molecules as amylopectin. Amylose has been shown to give a blue coloration with iodine and amylopectin a reddish color. Ordinary corn starch is thought to contain about 27% of the straight chain molecules; the remainder being amylopectin. After cooking in water, these straight chain molecules tend to orient themselves in parallel formation toward one another and toward the straight chain portions of the branched chain molecules, gathered together by secondary valence bonds—this orientation resulting in solidification or gelling of the suspensions. This process of orientation of the straight chain molecules with subsequent solidification is usually referred to as retrogradation.

While tuber starches are believed to contain approximately the same relative proportions of branched and straight molecules as does corn starch, it has been shown that the straight chain molecules in tuber starches, such as tapioca and potato, are much longer than those from corn starch. It is thought that these longer chain molecules naturally have more difficulty in becoming oriented in parallel fashion than would the relatively short chain molecules of corn. Thus, the lack of orientation of the tuber starch molecules tends to prevent precipitation or gelling (at normal temperatures). It is believed that the treatment of starch with organic acid anhydrides causes ester formation with the hydroxyl groups in the starch, thus forming rudimentary branches upon the straight starch chains. Thus, the starch is converted to a branched chain type, with the result that it gives more of a reddish color with iodine, and after cooking in water, the suspension exhibits the characteristics of non-gelling and clarity described.

Although this described tendency of starch to gel may not always lead to a solid gel, its corresponding manifestation is a thickening of the starch suspension or dispersion. The gelling tendency as defined applies to both tuber starches and grain starches or, in fact, to any starch which has been shown to contain straight chain molecules or amylose. In the case of ordinary corn starch, after a suspension of the starch is cooked and allowed to cool, the setting up or gelling begins to take place even before room temperature is reached. In the case of tapioca starch, no setting up or gelling will take place at room temperature, but the starch thickens; and if the starch, after cooking, is cooled sufficiently, the tapioca starch will gel or can be caused to gel and retrograde. By means of the treatment of the present invention, this tendency to gel (applicable to both grain starches and tuber starches) is greatly lessened. In the products of the present invention, this lessened tendency to gel is accompanied by the concomitant effect of increased translucence or lessened opacity. Therefore, by "non-gelling starch," as described herein, I mean starch having this defined characteristic of lessened tendency to gel combined with the effect of increased translucence or lessened opacity.

With regard to the effect of certain anhydrides such as succinic anhydride, in increasing the water absorptive powers of starch, it is believed that in such cases a reaction product is formed containing unesterified carboxyl groups. Since it is known that carboxyl groups have an affinity for water, it therefore follows that the presence of these carboxyl groups on the starch molecule could tend to substantially increase its water absorptive characteristics.

With regard to the effect of certain other anhydrides, such as adipic anhydride, in causing inhibition of the starch, it is believed that in such cases the anhydride reacts with two hydroxyl groups of the starch molecule, the reaction product forming a bridge between these molecules. This series of bridges tends to retard or "inhibit" the swelling of the starch granule when it is cooked in water, and this, in turn, causes the resultant cooked mass to be relatively non-cohesive and salve-like, the starch granule existing therein as substantially a discreet particle.

The making of the organic acid anhydride treated starches, the practice of the methods involved, and the industrial advantages of the products obtained will, in the main, be fully apparent from the above-detailed description thereof. The invention makes possible, for example, the use of freely available domestic corn starch in work where imported or relatively scarce domestic starches had heretofore been considered irreplaceable. It also opens entirely new fields of use for starches which, because of their gelling characteristics or their rubbery cohesiveness, had heretofore been barred from many industrial operations. Tapioca flour coming into the United States varies widely in quality from the so-called high grade starch which cooks to very clear cohesive pastes of high viscosity to the low grade flours which cook to opaque, less cohesive pastes of lower viscosity. By means of the process of the invention it is possible to substantially improve the quality of the lower grade tapioca starches by increasing their clarity, stability, etc.

Although I have listed various anhydrides as having certain effects upon starch; for example, acetic anhydride producing a non-gelling starch and succinic anhydride producing a high water absorptive starch, it should be understood there is not necessarily a clear line of demarcation between the various types of effects herein described. For example, maleic and succinic anhydrides not only produce a starch having increased water absorption but the resultant starch products also exhibit the non-gelling effect. Furthermore, while I have described the effects produced by certain types of anhydrides, the basic feature of the invention is the method of reacting starch with any organic acid anhydride.

It should be emphasized that the invention does not involve a conversion of starch in the sense of ordinary degradation by acids or other chemicals, and that the invention does not invlove a thinning of the starch. The starch products of the invention have substantially as high a water absorption as their corresponding untreated starches and, in fact, in some cases, as already explained, an amazing increase in water absorption is achieved. The product of the invention is a derivative of starch rather than a converted starch.

Where in the appended claims I refer to non-gelling or high water absorption or inhibition, I mean the properties as defined herein. Where organic acid anhydrides are mentioned, it is also meant to include the derivatives thereof as herein explained. Where specific anhydrides are called for, it will be understood that any of the equivalents described herein may be used instead with substantially the same results or effects. The invention is applicable, as explained, not only to starches but to starch derivatives or modifications, and where the claims refer to starch. it is understood that this is meant to include modified starches as well.

The reaction may be carried out upon ungelatinized, "raw" starch. Furthermore, since the reaction can be carried out at ordinary temperatures, the starch need not be gelatinized during the reaction. This means that the final product can be easily filtered and washed free of extraneous materials and residual odors—a factor of considerable importance in its industrial use.

It will be understod that many changes may be made in the product and the process of making the same without departing from the spirit of the invention defined in the following claims.

I claim:

1. An ungelatinized starch derivative comprising a reaction product of ungelatinized starch, water and an organic acid anhydride in an alkaline medium having a pH in the range of not substantially below 7 nor substantially above 11.

2. The starch derivative of claim 1 in which the anhydride is in the proportion of up to 10% on the dry weight of the starch.

3. The method of making an ungelatinized starch derivative which consists in reacting ungelatinized starch and water with an organic acid anhydride and maintaining the pH of the reaction in the alkaline range of not substantially below 7 nor substantially above 11.

4. The method of claim 3 in which the total anhydride in the reaction is in the proportion of up to 10% on the dry weight of the starch.

5. The method of making an ungelatinized starch derivative which consists in alternately adding to an aqueous suspension of ungelatinized starch, an organic acid anhydride and an alkaline meduim, and maintaining the pH of the ensuing reaction between the limits of 7 and 11 respectively.

6. The method of making an ungelatinized starch derivative which consists in concurrently adding to an aqueous suspension of ungelatinized starch, an organic acid anhydride and an alkaline medium, and regulating the rate of flow thereof so as to maintain the pH of the ensuing reaction between 7 and 11.

7. The method of making an ungelatinized starch derivative which consists in reacting ungelatinized starch in a powdered state containing from 5% to 20% moisture with an organic acid anhydride and an alkaline medium, and maintaining a pH of the reaction in the alkaline range of not substantially below 7 nor substantially above 11.

8. The method of claim 5, in which the total anhydride in the reaction is up to 10% on the dry weight of the starch.

9. The method of claim 6 in which the total anhydride in the reaction is up to 10% on the dry weight of the starch.

10. The method of claim 7, in which the total anhydride in the reaction is up to 10% on the dry weight of the starch.

11. An ungelatinized starch derivative which is non-gelling compared with the starch from which it is derived comprising a reaction product of ungelatinized starch, water and acetic anhydride in an alkaline medium having a pH in the range of not substantially below 7 nor substantially above 11.

12. An ungelatinized starch derivative of substantially increased water absorptive powers compared with the starch from which it is derived comprising a reaction product of ungelatinized starch, water and succinic anhydride in an alkaline medium having a pH in the range of not substantially below 7 nor substantially above 11.

13. An ungelatinized starch derivative which is relatively non-cohesive and salve-like compared to the starch from which it is derived comprising a reaction product of ungelatinized starch, water and adipic anhydride in an alkaline medium having a pH in the range of not substantially below 7 nor substantially above 11.

CARLYLE G. CALDWELL.

REFERENCES CITED

The following references are of record in the file of this patent:

UNITED STATES PATENTS

| Number | Name | Date |
| --- | --- | --- |
| 2,372,337 | Pacsu et al. | Mar. 27, 1945 |

OTHER REFERENCES

Ser. No. 326,497, Groen (A. P. C.), published April 20, 1943.